United States Patent
Korbel

Patent Number: 5,840,141
Date of Patent: Nov. 24, 1998

[54] SPLICE MEANS, A METHOD OF SPLICING AN ABRASIVE ARTICLE WITH SAME AND THE SPLICED ABRASIVE ARTICLE FORMED THEREBY

[75] Inventor: Gerald E. Korbel, North St. Paul, Minn.

[73] Assignee: Minnesota Mining and Manufacturing Company, St. Paul, Minn.

[21] Appl. No.: 678,923

[22] Filed: Jul. 12, 1996

Related U.S. Application Data

[62] Division of Ser. No. 293,655, Aug. 22, 1994, Pat. No. 5,595,804.

[51] Int. Cl.$^6$ .................................................... B32B 31/12
[52] U.S. Cl. ................. 156/153; 156/157; 156/159; 156/276; 156/281; 156/304.3; 156/304.5; 51/297; 428/58; 428/110; 428/114; 451/531
[58] Field of Search ................... 156/153, 157, 156/159, 276, 281, 304.3, 304.5; 51/297; 451/531; 428/110, 114, 58

[56] References Cited

U.S. PATENT DOCUMENTS

| | | | |
|---|---|---|---|
| 2,391,731 | 12/1945 | Miller et al. | 51/188 |
| 2,733,181 | 1/1956 | Riedesel | 154/116 |
| 3,333,372 | 8/1967 | Gianatasio | 51/399 |
| 3,729,873 | 5/1973 | Sandell | 51/297 X |
| 4,011,358 | 3/1977 | Roelofs | 428/287 |
| 4,018,574 | 4/1977 | Dyer | 51/295 |
| 4,027,435 | 6/1977 | Malloy | 51/295 |
| 4,082,521 | 4/1978 | McGarvey | 51/295 |
| 4,091,150 | 5/1978 | Roelofs | 428/57 |
| 4,194,618 | 3/1980 | Malloy | 206/205 |
| 4,215,516 | 8/1980 | Huschle et al. | 51/399 |
| 4,340,276 | 7/1982 | Maffit et al. | 350/164 |
| 4,736,549 | 4/1988 | Toillie | 51/399 |
| 5,137,984 | 8/1992 | Kangas et al. | 525/411 |
| 5,256,227 | 10/1993 | Roelofs | 156/157 |
| 5,575,873 | 11/1996 | Pieper et al. | 156/304.5 X |

FOREIGN PATENT DOCUMENTS

| | | |
|---|---|---|
| 0 182 347 | 5/1986 | European Pat. Off. |
| 0 455 400 | 11/1991 | European Pat. Off. |
| 0 529 833 | 3/1993 | European Pat. Off. |
| 2 075 760 | 10/1971 | France |
| 2 232 636 | 12/1990 | United Kingdom |
| WO 92/13017 | 8/1992 | WIPO |

*Primary Examiner*—Mark A. Osele
*Attorney, Agent, or Firm*—Richard Francis

[57] ABSTRACT

A splice having (a) a support comprising a polymeric film having a major surface; and (b) a fiber reinforcement comprising a plurality of monofilaments where the monofilaments have longitudinal axes extending in a parallel direction, one to another, across the major surface, and the monofilaments are bonded to the major surface of the support by a fiber adhesive, where the fiber adhesive is a moisture-cured polyurethane adhesive. The invention also relates to methods and products thereof for using the splice to form spliced flexible abrasive articles, including endless belt forms.

6 Claims, 1 Drawing Sheet ic
SPLICE MEANS, A METHOD OF SPLICING AN ABRASIVE ARTICLE WITH SAME AND THE SPLICED ABRASIVE ARTICLE FORMED THEREBY

This is a division application Ser. No. 08/293,655 filed Aug. 22, 1994 now U.S. Pat. No. 5,595,804.

BACKGROUND OF THE INVENTION

1. Field of the Invention

This invention pertains to an improved splice means, and further relates to a flexible abrasive belt having free ends joined with the splice means.

2. Background Art

Numerous sheet-like or layered articles which employ a backing layer of a tough flexible material are known. Typical examples include abrasive sheets, such as coated abrasive articles, pressure-sensitive adhesive tapes, photographic film, magnetic recording tape, and so forth. Of these, for example, a coated abrasive article comprises a flexible backing material having a plurality of abrasive particles adhered on one major surface thereof. The backings employed typically include paper, film forming plastic, cloth, metal foil, and the like.

These sheet-like materials, such as abrasive sheets, are typically formed or presented in a discrete nonendless form. As a consequence, the free ends of the sheet material(s) must be joined or spliced if it is desired to either lengthen a strip by joining a plurality of separate sheets, or, alternatively, if it is desired to form an endless belt arrangement from a single discrete sheet. However, there can be difficulties in successfully splicing free ends of sheet material, especially where the finished spliced article is destined for rigorous treatment in service.

For instance, flexible abrasive articles are available in a wide variety of forms such as endless abrasive belts, tubes, sleeves, discs and discrete sheets. A very popular form of flexible abrasive article is an endless belt that is fabricated by joining two free ends of the abrasive material together to form a joint, also known as the splice. In some constructions, the splice is held together by a splice adhesive applied to each of the two free ends and a splice media or means overlying the line of juncture and bonded to the splice adhesive.

These endless abrasive belts are often subjected to rigorous grinding conditions involving high temperatures, such as 200° C., and high grinding pressures, such as 10 kg/cm$^2$. The splice must be able to withstand these conditions so that the abrasive belt remains intact under such severe grinding conditions. Thus the splice adhesive and splice media each must be sufficiently heat resistant and tough to prevent a failure from occuring at the splice site before it happens in other areas of the abrasive article under severe grinding conditions. Naturally, good adhesion is desired between the splice adhesive and splice media. If either the splice adhesive or splice media cannot withstand such severe conditions, the splice will break or rupture. This breakage will end the useful life of the abrasive belt and full utilization of the abrasive belt is not achieved.

In addition to providing high adhesion within its own structural elements and with the free ends of the abrasive article, the splice media, as incorporated into the coated abrasive article, also must show good backwear properties. During use, the backside of the coated abrasive belt traverses over two or more idler wheels or contact wheels. As the splice media typically is located over the juncture or joint area on the backside of the abrasive article, tremendous wearing action is exerted on the splice media. Thus the splice media also must possess excellent wear resistance properties to avoid wear breakage.

It can be understood that what is desired by the abrasives industry is a splice that will consistently withstand relatively high temperatures and relatively high grinding pressures, as well as provide relatively high resistance to backwear throughout the entire useful life of the flexible abrasive article. Numerous proposals have attempted to address this need, although not thought to provide resolution without raising their own peculiar problems.

For instance, U.S. Pat. No. 2,733,181 (Riedesel) pertains to a coated abrasive splice media that comprises natural or artificial fibers or filaments such as glass or nylon filaments. The fibers or filaments typically are embedded into a thermoplastic or thermosetting adhesive. However, the thermosetting adhesives exemplified by Riedesel are solvent based, which requires increased cost and labor input as special precautions must be provided for the handling, ventilation and removal of the solvent and solvent emissions. On the other hand, Riedesel states that thermoplastic adhesives in the splice media ordinarily are ineffective for use with abrasive belts which heat up during operation.

U.S. Pat. No. 4,215,516 (Huschle et al.) teaches a splice media containing unidirectionally-oriented organic fibers such as polyamide or polyester type fibers. The fibers are embedded in an adhesive, which is variously exemplified as solvent based systems of a mixture of linear saturated esters of sebacic and terephthalic acids esterified and ethylene glycol modified with a cross linking agent such as polymethylene polyphenyl isocyanate; as well as an imide-amide-polyester copolymer, or polyurethane resin. Again, a solvent based splice media adhesive is undesirable as it requires increased cost and labor input attendant to the special precautions needed for handling and removal of the solvent and solvent emissions. Further, the adhesive solvents described by Huschle et al. for forming the solvent sytems are chlorocarbons, such as methylene chloride and 1,1,2-trichloroethane, which are obsolescent materials.

U.S. Pat. Nos. 4,011,358 and 4,091,150 (Roelofs) teach a splice media comprising a coextruded multilayer polyester film comprised of two monolithic layers having no fiber reinforcement, and a splice formed with such a splice media. The first layer is a non-crystalline adhesion-promoting layer which imparts toughness to the splice media and provides good adhesion with the splice adhesive. The second layer is a highly crystalline base layer which imparts strength to the splice media. Roelofs discloses, in the background section, mechanical roughening of the surfaces of polyester film to increase the adhesion to an adhesive.

U.S. Pat. No. 4,027,435 (Malloy) discloses a partially cured heat-activatable adhesive film as a preformed splice film used for splicing a coated abrasive article into an endless belt. The splice film adhesive can be used in a lap or butt splice arrangement between juxtaposed free ends of an abrasive sheet. While Malloy purports that no solvent from the splice adhesive film is evaporated in the belt making area; yet, the incipient preparation of the adhesive film does nonetheless involve handling of solvent based adhesive components. Also, while Malloy discloses an optional separate woven backing for the adhesive film which would be distanced from the splice site, there is only disclosed a monolithic adhesive film and no mention is made of reinforcing the splice adhesive layer itself with constituent fibers.

U.S. Pat. No. 4,082,521 (McGarvey) discloses a laminated patch splice for an endless coated abrasive belt. The patch splice is described as a slit woven fabric laminated to a plastic film, and the woven fabric is placed over the splice adhesive used to join the patch and free ends of an abrasive article. McGarvey teaches that preferred plastic films include polyimide, polyester, polyethylene, and cellulose triacetate film. On the other hand, the woven fabric is consolidated with the plastic backing film by fusion or an extraneous adhesive, such as polyurethane adhesives, epoxy adhesives and nylon-phenolic adhesives. The polyurethane adhesives can be thermoplastic or thermosetting. However, the axial fibers in the woven fabric layer of the patch splice in McGarvey are arranged as nonaligned and nonparallel with the running direction of the spliced endless belt, which typically is the direction of greatest stress developement in the belt. As the industry improves the strength of the abrasive side of the coated abrasive article, the splice must also be improved so that the splice does not become a source of structural failure in the coated abrasive article.

The field still awaits an improved splice means for abrasive articles which possesses strong internal cohesion and wear resistance and displays good adherability to a splice adhesive, while reducing the need for added adhesive steps and handling of bothersome and noxious adhesive solvents.

SUMMARY OF THE INVENTION

This invention pertains to an improved splice means, and further relates to a flexible abrasive belt having free ends joined with the splice means. The improved splice means can be manufactured without the need to contend with adhesive solvents and additional adhesive steps associated therewith, while the product itself displays excellent flexural strength and tensile strength. These attributes of the splice means of the invention, in turn, impart improved durability and wearability in abrasive articles that are spliced with the splice means of the invention.

In one embodiment of the invention, there is a splice means having (a) a support means comprising a polymeric film having a major surface; and (b) a fiber reinforcement means comprising a plurality of monofilaments where the monofilaments preferably have longitudinal axes extending in a parallel direction, one to another, across the major surface, and the monofilaments are bonded to the major surface of the support means by a fiber adhesive, where the fiber adhesive is hot melted, cooled to a solid state and cross-linked by exposure to water vapor or water moisture and in the absence of nonaqueous liquid solvent to bond the monofilaments to the support means.

For purposes of this invention, the fiber adhesive, in general, is a urethane adhesive which is a "moisture curable hot melt adhesive". That is, the fiber adhesive is a reactive hot melt urethane adhesive system which is solid at room temperature, melts to a viscous liquid when heated to moderate temperature (60° C. to 150° C., preferably 80° C. to 125° C.) and is applied in the molten state. The adhesive then cools to a solid state to provide initial bond strength (i.e. green strength) and additionally, cures or cross-links on contact with ambient water vapor or moisture to provide its final bond strength. Generally, the preparation of the fiber adhesive of this invention can be and is accomplished without the use of solvents as a 100%-reactive solvent-free adhesive system.

For instance, the fiber adhesive of the invention can comprise a blend of isocyanate-terminated polyurethane prepolymers comprising: (a) a first prepolymer comprising the reaction product of an at least essentially semicrystalline hydroxy-functional material and a polyisocyanate: (b) a second prepolymer which comprises the reaction product of a poly (tetramethylene glycol) ether and a polyisocyanate; and (c) a third prepolymer which comprises the reaction product of an essentially amorphous hydroxy-functional material and a polyisocyanate. The blend may also include a fourth prepolymer which comprises the reaction product of a slightly branched hydroxy-functional material and a polyisocyanate to increase tack.

The fiber adhesive is applied to a major surface of said support means at a coating weight of about 1 to about 9 mg/cm$^2$. The filament reinforcements are then applied on the coated fiber adhesive, before it completely cures, on the support means. Therafter, the fiber adhesive cures to tenaciously adhere the filaments to the surface of the support means.

In another further embodiment of the splice means of the invention, the polymeric film is a film material selected from the group consisting of polyimide, polyester, polyamide, polyether ketone, polyether sulfone and polyetherimide. Preferably, the polymeric film is a semicrystalline polymeric film such as a polyimide film, polyester film, or a polyamide film.

In one preferred embodiment, a polyimide film is used as the splice means backing. The polyimide film thickness generally is from about 10 to 80 micrometers. The polyimide film generally is more durable and incurs less backwear than polyester or polyamide splice backings. Although not essential to achieving satisfactory results in this invention, it nonetheless can be desirable to improve the adherability of the polyimide backing to the fiber adhesive. Therefore, it is another embodiment of the invention to condition the surface of the polyimide with sputter etching before receiving the fiber adhesive. For instance, the polyimide, or any other type of support backing material of the invention, can be sputter etched to provide a plurality of micropedestals formed therein of a height of from about 0.01 to 1.0 micrometers and spaced apart at a distance of from about 0.05 to 0.5 micrometers, which add a physical grip on the fiber adhesive.

In yet another further embodiment of the splice means of the invention, the reinforcing monofilaments are derived from bundles of monofilaments having a denier of from about 150 to 900. These bundles of monofilaments contain about 50 individual filaments which have been mechanically interlocked by light air-entanglement. These bundles are loosened to free the individual monofilaments from one another on the support film. The total number of monofilaments laid on the surface of the support means is in the range from 295 to 2560 filaments per cm as determined by counting filament ends along an edge of the support means and in a direction perpendicular to the central axes (length) direction of the monofilaments. In one embodiment, approximately 8–20 bundles of 220 denier polyester yarns are provided per cm of support film, each bundle comprising approximately 50 polyester filaments, and the bundles loosened to free the individual constituent filaments by rolling action and the like over the bundle surfaces. The monofilaments are maintained in a substantially common direction of orientation along their longitudinal axes after being freed from the bundles to provide uni-directionally laying filaments on the support film. The monofilaments generally have individual diameters of about $2.3 \times 10^{-2}$ mm and a tensile modulus of about $1.57 \times 10^5$ kg/cm$^2$. The monofilaments are untwisted to form a unidirectional essentially single layer of essentialy free monofilaments in the fiber adhesive, which is previously coated on the support means. The monofilaments generally are arranged as one to five layers, which are stacked one on top of the other in the case of more than one layer; instead, the monofilaments are reposed on the surface of the polymeric film substantially in side-by-side arrangement. The individual monofilaments have a denier of from about 2 to 15. In a further embodiment, the monofilaments are formed from a material selected from the group consisting of polyvinyl alcohol, fiberglass, polyester, steel, cotton, carbon, polyamide and polyethylene terephthalate.

Some nominal amount of inadvertent crossing and intertwining may occur between some of the filaments freed from the bundles, but the amount is not substantial. Instead, the vast majority of the filaments are "monofilaments", which means individual monolithic threads are physically noninterlocked, such as by co-twisting, with other filaments, nor are tranverse threads present to interlace the individual monofilaments.

In another embodiment of the invention, there is a splice comprising:

(a) two free sheet ends of abrasive sheet material juxtaposely abutted together to form a juncture line, wherein the abrasive sheet material has a central axis and opposed major surfaces with a coating of abrasive grains bonded to one of the major surfaces and a backing side constituting the other of the major surfaces; and (b) the aforesaid splice means overlapping the juncture line on the backing side and bonded thereto by a splice adhesive means disposed adjacent the juncture line on surfaces of the two free sheet ends which are overlapped by the splice means, and the aforesaid plurality of monofilaments in the splice means being arranged on the major surface of the support means so as to span the juncture line and are oriented in a generally parallel direction to the central axis of the abrasive sheet material.

In one further embodiment, the aforesaid splice can be formed in the two free ends of a discrete abrasive sheet material to form an endless belt or cone structure. The invention also encompasses methods for making such a spliced abrasive article or endless belt.

Additionally, the invention also encompasses a method and product thereof for splicing a flexible abrasive belt comprising the steps of:

(a) forming a composite surface by applying, onto at least one major face of a polymeric film, discontinuous microislands of a material selected from the group consisting of metal oxides, refractory metals, and noble metals having a lower rate of sputter etching than said polymeric film, wherein portions of the polymeric film are exposed between the discontinuities of the microislands;

(b) sputter etching the composite surface in a partial atmosphere of a reactive gas to promote formation of a top layer on said microislands having a lower sputtering rate than the polymeric film, whereby the exposed portions of the polymeric film are etched and removed at a faster rate than the top layer to form micropedestals structures in the composite surface;

(c) forming a splice means comprising (i) providing a support means composed of said sputter etched polymeric film formed by above step (b), and (ii) coating said support means with a fiber adhesive comprising a moisture-cured, non-solvent based hot melt urethane resin, and (iii) arranging a plurality of monofilaments in parallel orientation to each other on the sputter-etched and fiber adhesive-coated polymeric film, and (iv) curing said fiber adhesive;

(d) positioning two free sheet ends of an abrasive sheet material together into juxtaposed abuttment to form a juncture line, wherein said abrasive sheet material has opposed front and back major surfaces comprising a coating of abrasive grains bonded to the front major surface;

(e) coating the two free sheet ends on the back major surface with a polymerizable splice adhesive and optionally a polymerization reaction catalyst or accelerator;

(f) positioning the splice means to overlap the juncture line and contact the splice adhesive on the back major surface of the two free sheet ends, and wherein the monofilaments are oriented in a generally parallel direction to the central axis of the abrasive sheet material; and (g) curing the splice adhesive.

In one further embodiment using the sputter etching treatment on the support means, the polymeric film comprises polyimide. The sputter etching treatment generally increases the polymeric film surface area and forms micropedestals which anchor the fiber adhesive to thereby increase the adhesion between the polymeric film and the fiber adhesive. Also, in a further embodiment, the back surfaces of the abrasive article at the free ends to be spliced, are textured or roughened before application thereto of the splice adhesive, such as by scuffing or light abrasion with a wire brush or sandblasting, to enhance the bond to the splice adhesive.

The invention itself, both as to its constructs and methods, as well as additional embodiments, objects and advantages thereof, will be better understood from the following description of the drawings and preferred embodiments of the present invention.

DETAILED DESCRIPTION OF THE PREFERRED EMBODIMENTS

This invention pertains to an improved splice means, and further relates to a flexible abrasive belt having free ends joined with the splice means. The improved splice means can be and is manufactured without the need to contend with adhesive solvents and additional adhesive steps associated therewith, while the product itself displays excellent flexural strength, and tensile strength. These attributes of the splice means of the invention, in turn, impart improved durability and wearability in abrasive articles that are spliced with splice means of the invention.

A flexible abrasive article, which can be spliced by the invention, typically comprises a backing having a plurality of abrasive particles bonded to the backing by means of one or more binders. The general construction of these articles is known. Examples of typical backings include polymeric film, primed polymeric film, cloth, paper, vulcanized fiber, nonwovens and treated versions thereof and combinations thereof. Examples of abrasive particles include fused aluminum oxide, ceramic aluminum oxide, heated treated aluminum oxide, silicon carbide, alumina zirconia, diamond, ceria, cubic boron nitride, garnet and combinations thereof. The term abrasive particles also encompasses individual abrasive particles bonded together to form an abrasive agglomerate. Abrasive agglomerates are further described in U.S. Pat. Nos. 4,652,275 and 4,799,939 incorporated herein after by reference. Examples of typical binders include phenolic resins, aminoplast resins, urethane resins, epoxy resins, acrylate resins, acrylated isocyanurate resins, urea-formaldehyde resins, acrylated urethane resins, acrylated epoxy resins and mixtures thereof.

Examples of typical flexible abrasive articles include coated abrasives, lapping coated abrasives and nonwoven abrasives. In a coated abrasive construction, the abrasive particles are secured to the backing by means of a first binder, commonly referred to as a make coat. Over the make coat and abrasive particles is applied a second binder or size coat which reinforces the abrasive particles. In a lapping coated abrasive construction, the abrasive particles are dispersed in the binder to form an abrasive composite and this abrasive composite is bonded to a backing. For a nonwoven abrasive, the binder bonds the abrasive particles into a nonwoven fibrous substrate.

Figure 1:
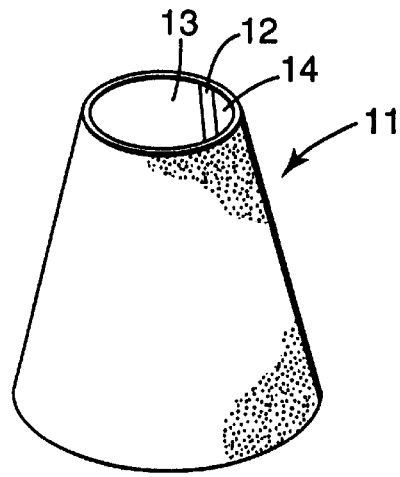
FIG. 1 is a perspective view of a flexible spliced abrasive article of the present invention configured in the form of a cone.
Figure 2:
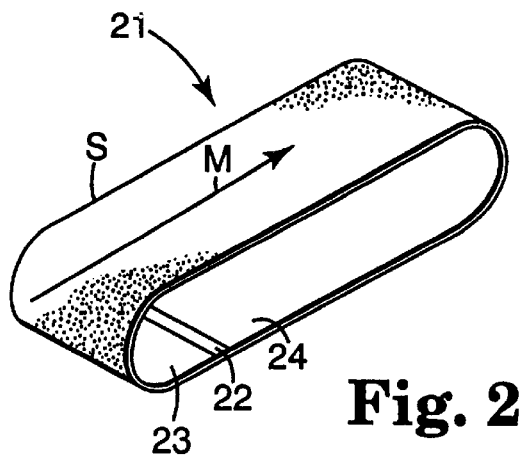
FIG. 2 is a perspective view of another type of flexible spliced abrasive article of the invention configured in the form of an endless belt.

The flexible abrasive article, as spliced by the present invention, can be formed into an endless loop, such as a cone, cylinder or belt, by splicing together two free ends of the flexible abrasive article. By way of example referring to FIG. 1, this endless loop is a spliced abrasive article 11 formed into a cone shape by employing splice means 12 of the invention to splice the two free ends 13 and 14 of the abrasive article 11. Referring to FIG. 2, the endless loop can be formed into an endless belt 21 having two free ends 23, 24 spliced together by splice means 22. The machine direction "M" (or central axis) of the endless belt runs parallel to side edge "s".

Figure 3:
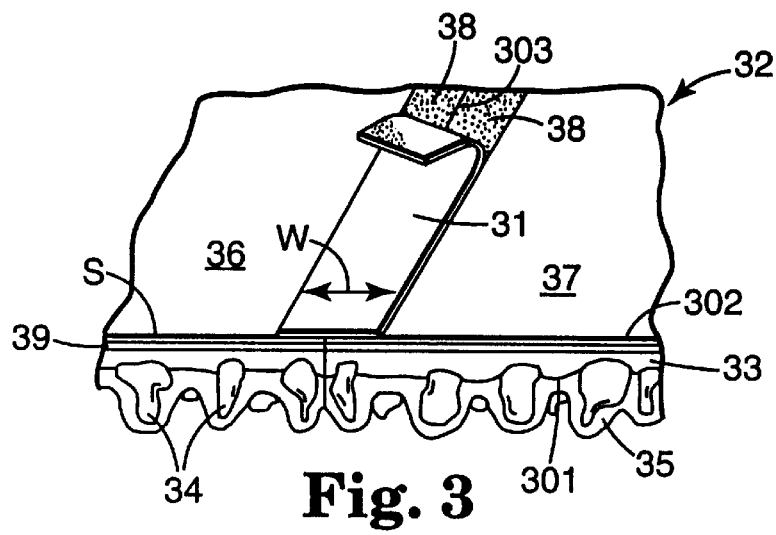
FIG. 3 is an enlarged perspective view of the backside of the spliced portion of a flexible spliced abrasive article of the present invention with a splice means of the invention thereon.

FIG. 3 illustrates a partial cross sectional view of an abrasive article 32 having free ends 36 and 37 joined at juncture line 303 by splice means 31 of the invention. The flexible abrasive article 32 comprises flexible backing layer 39 having a plurality of abrasive particles 34 bonded to front surface 301 of the backing 33 by means of binder in an overlying size coat 35 and an underlying make coat 33. The backing layer 39 can also have a conventional backsize or backing primer layer preformed as the back surface 302. In any event, the two free ends 36, 37 of the flexible abrasive article 32 are butted against one another at juncture line 303. The free ends of the abrasive article to be spliced can be cut at complementary bias angles in the range of from about 100° to 1700°, more typically about 60° to about 120°, relative to the machine direction (parallel to a side edge "s") of the abrasive article. For instance, if end 36 is cut at 65°, the end 37 would be cut a complementary angle of 115°.

The back surfaces 302 at the two free ends preferably are scuffed or abraded to texture or roughen the surface regions before contact with the splice adhesive and splice means. The scuffing should be superficial and not be intense so as to remove substantial amounts of the thickness of backing 39. The splice adhesive 38 is applied to the two free ends 36, 37 on the back major surface 302 of the abrasive article (backing layer 39) before or after the two free ends are brought together and optionally roughened. The joined ends and splice adhesive are then contacted by the splice media or means 31 as arranged over the juncture line 303 to form the butt splice in the abrasive article. The term "abutted", and the like, for purposes of this invention, encompasses contacting side faces of the two free ends or two free ends in close proximity to each other yet non-contacting. However, the term "abutted", and the like, does not mean overlapped or lapped arrangements of the two free ends. The splice of the invention can be used to lengthen an abrasive sheet article and/or the splice can be used to form the abrasive article into a continuous surfaced structure, such as a belt.

Splice Means

The splice means of this invention, in greater detail, comprises a support means as a backing bearing a fiber reinforcement described herein, and the support means preferably is a polymeric film. Examples of polymeric films for the splice means of the invention include polyester films, polyamide films, polyimide films, polypropylene films, polyethylene films, polyether ketone films, polyether sulfone films, and polyetherimide films. The polymeric films are preferably a semi-crystalline polymeric film, such as a polyester film, a polyamide film and a polyimide film. The polymeric film generally has a thickness of about 5 $\mu$m to about 76 $\mu$m.

Polyimide films are a preferred support film for the splice media or means due to their excellent mechanical properties (good wear resistance), heat resistance and oxidative stability. Abrasive articles which are spliced with a splice means of the invention having a polyimide support backing show excellent backwear resistance. Polyimide films are formed from the condensation reaction of bifunctional carboxylic acid anhydrides and primary diamines. These polyimide polymers contain an imide structure, i.e., —CO—NR—CO— as their backbone. One suitable example of polyimide as the polymeric film is KAPTON® polyimide film of 25 $\mu$m thickness, available from DuPont Company. Polyimide films are generally used in a thickness of 10 to 80 micrometers. Generally, the adhesive strength achieved between a polyimide film and the fiber adhesive used in this invention is at least 1.1 kg/cm, more preferably at least 2.5 kg/cm.

Figure 4:
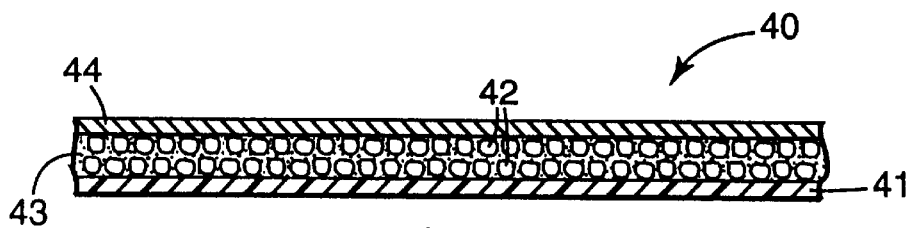
FIG. 4 is an enlarged cross-sectional view of one type of splice means of the invention.

Referring to FIG. 4, in one embodiment of the invention, the splice means 40 comprises a polymeric film 41. The polymeric film is coated on a major surface with moisture-curing urethane fiber adhesive 43, described in greater detail elswhere herein. A plurality of reinforcing monofilaments 42 are arranged on the fiber adhesive while it is still in a wet uncured state with the monofilaments maintained in a generally parallel orientation to each other. The reinforcing monofilaments are arranged in a scheme of two stacked layers. These reinforcing filaments are secured to the polymeric film upon cure of fiber adhesive 43.

Typically, the fiber adhesive is present in a sufficient amount to engulf and fill the interstices through the entire thickness of the monofilaments. Again, the fiber adhesive typically is preapplied to the bare surface of the support means and the reinforcing monofilaments are then placed in the fiber adhesive coating.

Optionally, a primer adhesive 44 is applied over the reinforcing fibers to further increase the adhesion between the splice media and the splice adhesive. Also, the primer adhesive, if used, can be a solvent-based polyurethane adhesive, such as mentioned herein.

Finally, a splice adhesive can be applied over any primer adhesive or directly upon monofilaments 42 if no primer adhesive is used. Of course, it will understood that the splice adhesive alternatively and more typically is directly coated upon the back surfaces of the free ends of the abrasive article in those regions immediately adjacent the juncture line to be spliced with the splice means.

The reinforcing monofilament fibers are incorporated into the splice means to improve the strength and tear resistance of the coated abrasive belt. Examples of reinforcing fibers include monofilaments of fiberglass, polyester, steel, cotton, carbon, polyamides or aramid type such as KEVLAR® fiber commercially available from the DuPont Company of Wilmington, Del. and combinations thereof. Typically the source yarns (or bundles) for the monofilaments have a denier in the range between 150 to 900, inclusive of standard yarn denier sizes of 220, 440 and 840. The yarns are untwisted to loosen the bundles and provide separated monofilaments of the material. The monofilaments are arranged at a quantity of 295 to 2560 filaments per cm perpendicular to the measured direction on the support means. The monofilaments are formed into a stacked layering of superposed filaments with adjacent filaments horizontally and vertically in contact or in very close proximity, such as no gaps or spaces (vertical or horizontal) are permitted between filaments of greater than about 30 micrometers.

The filaments should be continuous without disruptions in extent from one side of the polymeric film to the opposite edge. That is, in one preferred embodiment, the monofilaments are selected to have a length which substantially corresponds to the width dimension "w" (FIG. 3) of the polymeric support film of the splice means. That is, the polymeric support film generally is formed into a rectangular shape, or a parallelogram shape, having a length dimension "P" and width dimenion "w". The width dimension w of the splice means will run generally parallel to the machine direction of the abrasive article to be spliced and intersect the juncture line 303, ordinarily at an angle of about 90 degrees. As can be understood, the length dimension of the splice means will have a magnitude dictated by the width of the abrasive article to be spliced. The length dimension runs perpendicular to the width dimension w and parallel to the juncture line at the ends of the abutting ends of an abrasive article to be spliced by the splice means.

As one example of the filament arrangement in the splice means of the invention, there is per cm of the surface of the support means bearing the fiber adhesive, approximately 8–20 bundles of 220 denier polyester yarns or bundles, each containing about 50 individual monofilaments (about $2.3 \times 10^{-2}$ mm diameters, $1.57 \times 10^5$ kg/cm$^2$ tensile modulus each), can be untwisted and arranged to form a unidirectional layering of essentialy free monofilaments in the fiber adhesive. The individual monofilaments have a denier of from about 2 to 15. The reinforcing filaments, as arranged unidirectionally on the support means of the splice means, may be oriented at a nonzero angle relative to the central axis of the abrasive article sheet or belt. However, it is preferred that the reinforcing fibers in the splice means be disposed in a direction parallel to the central axis direction of the abrasive article sheet or belt when the splice means is incorporated into the splice in the abrasive sheet or belt. This parallel angle will usually increase the tear resistance of the splice means, and thus is preferred. The angle of the fibers in the splice means with the central axis of the abrasive article, as spliced, is preferably at least substantially parallel thereto, that is, within ±5°.

Fiber Adhesive

Generally, the preparation of the fiber adhesive used to bond the reinforcing fibers to the polymeric support means of the splice means of this invention can be and is accomplished without the use of solvents as a 100%-reactive solvent-free adhesive system. The fiber adhesive of the invention is a moisture-curable hot melt type of adhesive.

In general, the fiber adhesive is a blend of certain isocyanate-terminated polyurethane prepolymers which provide a moisture-curable hot-melt adhesive system. The blend comprises first, second, third, and, optionally, fourth, prepolymers, such as described in PCT Published Application No. WO 92/13017 (6 Aug. 1992), which is incorporated herein by reference. Each of the prepolymers comprises the reaction product of a hydroxy-functional material and a polyisocyanate.

More particularly, the first prepolymer comprises the reaction product of an at least essentially semicrystalline hydroxy-functional material and a polyisocyanate. By "essentially semicrystalline" it is meant that the first hydroxy-functional material exhibits both a crystalline melting temperature (Tm) and a glass transition temperature (Tg). The at least essentially semicrystalline hydroxy-functional material preferably has an essentially linear, saturated, aliphatic structure, a crystalline melting temperature between about 5° C. and 120° C. (more preferably between about 40° C. and 105° C.), a glass transition temperature less than about 0° C. Included within the scope of "at least essentially semicrystalline" materials are those materials which may be regarded as essentially crystalline.

The polyester polyol used to prepare the first prepolymer typically has a number average molecular weight (Mn) of at least about 2000, preferably at least between about 2200 and about 10,000, and most preferably between about 2500 to about 7,500. At a Mn below about 2000, the resultant prepolymer is soft and may lack cohesive strength in the uncured state. At a Mn above about 10,000, the resultant prepolymer tends to be viscous which increases the difficulty of depositing acceptably thin lines of adhesive on a substrate.

If the hydroxy-functional material of the first prepolymer is provided in the form of a polyester polyol, it may comprise the reaction product of a polyol, for example, a diol, and a polyacid, for example, a dicarboxylic acid.

The at least essentially semicrystalline hydroxy-functional material may comprise the reaction product of an alphatic diol having from about 2 to 10 methylene groups and a dicarboxylic acid having from about 2 to methylene groups. Diols useful in forming the at least essentially semicrystalline hydroxy-functional material may comprise, for example, those having from 2 to 10 methylene groups such as ethylene glycol, 1,4-butanediol, 1,5-pentanediol, 1,6-hexanediol, 1,8-octanediol, and 1,10-decanediol. Cycloaliphatic diols such as, for example, 1,4-cyclohexanediol and 1,4-cyclohexanedimethanol may also be employed.

Dicarboxylic acids useful in preparing the hydroxy-functional material of the first prepolymer include, for example, those having from about 2 to 10 methylene groups such as succinic acid, glutaric acid, adipic acid, sebacic acid, azelaic acid, and 1,12-dodecanedioic acid, derivatives thereof, and mixtures thereof. Included within the scope of useful acids are acid derivatives such as acid anhydrides, acid halides, and alkyl esters such as, for example, the methyl and ethyl esters.

Suitable essentially semicrystalline polyester polyols useful in the invention include, for example, polyhexamethylene adipate, polybutylene adipate, poly-ϵcaprolactone, and combinations thereof. Preferably, the essentially semicrystalline polyester polyol is polyhexamethylene adipate and most preferably, 1,6-polyhexamethylene adipate. 1,6-polyhexamethylene adipate is the reaction product of 1,6-hexanediol and adipic acid.

Examples of commercially available essentially semicrystalline polyester polyols useful in the invention include, for example, FORMREZ 66-20, an adipate polyester diol (poly [1,6 hexane adipates] (OH=20.8)) available from Witco Chemical Company; LEXOREZ 1130-30P from Inolex Chemical Co.; RUCOFLEX 105-37 from Ruco Polyair Corporation; DYNACOLL 7360 from Hüls America; TONE 1271 from Union carbide, and combinations or mixtures thereof.

The preferred hydroxy-functional material used to prepare the second prepolymer in the fiber adhesive is a poly-(tetramethylene ether) glycol, which is typically produced by cationic polymerization of tetrahydrofuran (THF). The Mn of the poly(tetramethylene) glycol is preferably at least about 1,000. Examples of commercially available poly(tetramethylene ether) glycols include, for example, POLYMEG 2000 from QO Chemical, Inc., the TERATHANE series from DuPont, and POLYTHF from BASF.

The essentially amorphous material used in the fiber adhesive of the invention in preparing the third prepolymer exhibits a Tg but lacks a Tm. Preferably the Tg is between about 0° and 50° C. and more preferably between about 0° C. and 40° C. The third prepolymer preferably is provided in the form of an amorphous polyester polyol having a Mn of at least 1000, preferably between about 1200 to 7500. If the Mn is below 1000, the resultant prepolymer may lack sufficient cohesive strength, while if the Mn is above 7500, the resultant prepolymer is highly viscous and may be difficult to blend and apply at working temperatures. Preferably, the essentially amorphous polyester polyol used to prepare the third prepolymer has at least some aromatic functionality.

Essentially amorphous polyester polyols useful in the invention include, for example, copolyesters formed during reactions between and/or among the following diols and diacids: neopentyl glycol, ethylene glycol, propylene glycol, 1,4-butanediol, 1,6-hexanediol, adipic acid, orthophthalic acid, isophthalic acid, and terephthalic acid. Preferably, the amorphous polyester polyol comprises the reaction product of ethylene glycol, neopentyl glycol, orthophthalic acid and adipic acid. Examples of commercially available amorphous polyester polyols useful as the fiber adhesive in the invention include, for example, DYNACOLL 7110 and DYNACOLL 7111, each available from Hüls America, and combinations thereof.

In some instances it may be optionally desirable to add a fourth isocyanate-terminated polyurethane prepolymer to the blends of the invention for example, to further enhance tack, cohesive strength, and/or compatibility of the mixture. In particular, a fourth prepolymer derived from a slightly branched hydroxy-functional material (e.g. polyester polyol), and a polyisocyanate, can improve the aggressive tackiness of an adhesive formulation otherwise comprised of the first, second, and third prepolymers. By "slightly branched" it is meant that the hydroxy-functional material has a hydroxyl functionality greater than 2 but less than about 3.5. "Functionality" is defined as the number of reactive groups (i.e. hydroxyl groups) per molecule. The Mn of the slightly branched polyester polyols useful in the invention may be derived from the reactions of diethylene glycol, trimethylol propane and adipic acid. An example of a commercially available slightly branched polyester polyol useful in the fiber adhesive of the invention is LEXOREZ 1931-50P, available from Inolex Chemical Co.

It has been noted hereinabove that the semicrystalline and amorphous polyester polyols may be defined in part with reference to whether they display a Tg and/or a Tm. The presence and/or absence of a glass transition temperature and a crystalline melting point are techniques often used to characterize semicrystalline and amorphous (glassy) polymers. The two thermal transitions, Tg and Tm, can be quantitatively determined by measuring changes in specific volume and heat capacity through accepted analytical procedures such as differential scanning calorimetry (DSC). More particularly, Tg and Tm were measured with a Perkin-Elmer 7 series Thermal Analysis System programmed to scan at a rate of 20° C./min. The midpoint of the endothermic peak was considered to be the Tg. Tm was considered to be the temperature at the apex of the endothermic peak. These techniques are described more fully in *Thermal Characterization of Polymeric Materials*, edited by Edith A. Turi (published 1981 by Academic Press, York, York).

Polyisocyanates which can be reacted with the hydroxy-functional materials to form the prepolymers used in the fiber adhesive of the instant invention may be aliphatic or aromatic. Preferably, they are aromatic diisocyanates such as diphenylmethane-2,4'-diisocyanate and/or diphenylmethane 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4, 4',4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate.

A list of useful commercially available polyisocyanates is found in the *Encyclopedia of Chemical Technology*, Kirk-Othmer, 2nd Ed., vol. 12, pp. 46–47, Interscience Pub., New York (1967), which is incorporated herein by reference. Especially preferred isocyanates include diphenylmethane-4,4'-diisocyanate and its isomers and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as ISONATE 143L, commercially available from Dow Chemical Company). Small amounts of polymeric diphenylmethane diisocyanate, preferably 10% or less by weight of the total isocyanate components, (e.g., PAPI, and the series PAPI 20, commercially available from Dow Chemical Company, the MONDUR M, MR and MRS series of isocyanates commercially available from Miles Inc., and RUBINATE M, commercially available from ICI Chemicals, Inc.) may be included. Blocked isocyanate compounds formed by reacting aromatic isocyanates or the above-described isocyanate-functional derivatives with blocking agents such as ketoximes and the like are also included within the invention. Such blocked isocyanate-functional derivatives will, for convenience, be regarded herein as isocyanate-functional derivatives of MDI and TDI.

The prepolymers useful herein may be prepared by techniques that are well known in the art. For example, prepolymers suitable in the invention may be formed by reacting a mixture of the hydroxy-functional polymers and the polyisocyanate(s) in a suitable vessel Alternatively, the prepolymers may be prepared by reacting each of the hydroxy-functional polymers separately with the polyisocyanate(s) followed by blending of the resultant prepolymers. Still further, the prepolymers may be prepared by forming one prepolymer and subsequently forming the other prepolymer or prepolymers in the first.

Typically, the components are mixed at an elevated temperature using conventional mixing techniques. It is preferred to mix the components under anhydrous conditions. Generally, the prepolymers are prepared without the use of solvents although solvents may be employed if desired.

The isocyanate equivalents should be present in the reaction mixture in an amount greater than the hydroxyl equivalents. The equivalent ratio of isocyanate-to-hydroxyl (NCO/OH), sometimes referred to hereinafter as the isocyanate index, is preferably from about 1.2/1 to about 10/1 and especially preferably from about 1.5/1 to 2.2/1.

The compositions of the invention may further include isocyanate-terminated polyurethane prepolymers other than the prepolymers described above. The additional prepolymers may be added to the prepolymer blends of the invention for a variety of purposes such as to further adjust the open time, green strength build-up, tack, final strength, compatibility, adhesion etc. of the resultant mixture.

The prepolymer blend used in the fiber adhesive of the invention preferably comprises from about 10 to about 80 parts by weight of the first prepolymer, from about 10 to about 80 parts by weight of the second prepolymer, and from about 10 to 80 parts by weight of the third prepolymer, per 100 parts by weight of the prepolymer blend. More preferably, the prepolymer blend of the fiber adhesive preferably comprises, per 100 parts total formulation weight, from about 45 to about 60 parts by weight of the first prepolymer, from about 15 to about 20 parts by weight of the second prepolymer, and from about 15 to 35 parts by weight of the third prepolymer, per 100 parts by weight of the prepolymer blend. If the fourth prepolymer is included in the mixture, it preferably comprises no more than up to about 15 parts by weight, and most preferably from 1 to about 10 parts by weight per 100 parts by weight of the prepolymer blend.

Similarly, other monomeric materials may also be included with the prepolymer blend in the polymerization mixture of the fiber adhesive so as to incorporate them directly into either the hydroxy-functional materials of the prepolymers or the prepolymers themselves. Examples of such monomeric materials which may be used to modify the polyester polyols include neopentyl glycol, ethylene glycol, butanediol, hexanediol, succinic acid, sebacic acid, terephthalic acid, orthophthalic acid, etc. The exact level of "other monomer" utilized is not critical to the invention provided it does not materially negatively affect the adhesion of the composition. Typically, the other monomers may comprise up to 50 mole percent of the polymerization mixture.

Also, the inventive fiber adhesive compositions may include other ingredients or adjuvants with the prepolymer blend to impart or modify particular characterisitics of the composition. These ingredients are included in the overall blends or mixtures rather than being incorporated into the constituent components thereof. The adjuvants should be added only at a level that does not materially adversely interfere with the adhesion of the composition. The ajuvants may comprise up to 50 weight percent of the composition either individually or in combination. For example, chain-extension agents (e.g., short chain polyols such as ethylene glycol or butanediol); fillers (e.g., carbon black; glass, ceramic, metal, or plastic bubbles; metal oxides such as zinc oxide; and minerals such as talc, clays, silica, silicates, and the like), thermoplastic resins; plasticizers; antioxidants; pigments; U.V. absorbers; and adhesion promoters such as silanes, and the like may be included to modify set time, open time, green strength build-up, tack, flexibility, adhesion, and the like.

In addition, the fiber adhesive compositions can include an effective amount of catalyst or reaction accelerator such as tertiary amines; metal-organic compounds, such as dibutyl tin dilaurate; co-curatives, and the like. An effective amount of a catalyst is preferably from about 0.005 to 2 percent by weight of the total prepolymer weight. More preferably, the catalyst is present at a level of about 0.01 to about 0.5 percent, based on the total weight of the prepolymers employed. Preferred catalysts are tertiary amines. Especially preferred catalysts are the tertiary amines known as bis [2-(N,N-dialkylamino)-alkyl]ether(s) (sometimes known as "bis ethers"). Suitable bis ethers are described, for example, in U.S. Pat. No. 3,330,782, and include, for example, bis [2-(N,N-dimethylamino)ethyl]ether, bis [2-(N, N-dimethylamino)-1-methylethyl]ether, and 2-(N,N-dimethylamino)ethyl-2-(N,N-dimethylamino)-1-methylethyl ether. One exemplary bis ether is bis [4, 4'-morpholino)-2-ethyl]ether (DMDEE) commercially available from Texaco Chemical Company, Houston, Tex. 77227, under the designation THANCAT DMDEE.

A commercially available moisture-curing urethane adhesive which can be used as the fiber adhesive of the invention is available from 3M company, St. Paul, Minn. , under the the trade designation JET-WELD™ TS-230.

The fiber adhesive is applied to a one major surface of the polymeric support means at an application rate of about 1 to about 9 mg/cm$^2$. At an application rate below 1 mg/cm$^2$, there might be insufficient adhesive available to firmly anchor the filaments to the polymeric support film. If the application rate exceeds 9 mg/cm$^2$, the thickness of the splice means might be increased beyond a desirable level. It is desirable to construct the splice means as thin as possible but without unduly sacrificing sufficient strength to hold the splice together so as to prevent undue bumps from being created along the surface of the abrasive article at the splice site. These bumps can interfere with and impede proper drive movement of the spliced belt and can produce undesirable marks on the article being abraded.

Sputter Etching Technique

In one embodiment of the invention, it is desired to increase the surface area of the support means available for bonding to the fiber adhesive by sputter etching a surface of the polymeric film intended as the support means. Generally, during sputter etching, very small surface protuberances are generated in the surface regions of the polymeric film by appropriate manipulation of the sputtering conditions. The microstructured surface does not adversely effect the mechanical properties of the polymeric film while providing improved anchorage for subsequently applied coatings.

In general, the sputtering process of the invention involves two basic steps: (1) coating masking material as microislands on the surface of the bulk material and (2) sputter etching to remove bulk material exposed between the microislands.

As known, a plasma is a collection of ions in an excited state. In the typical sputtering apparatus there will be two metal plates arranged in an air-tight chamber. The chamber is filled with a gas, typically nitrogen, argon or oxygen, and the chamber is put under a partial vacuum. A high energy source is connected between the two chargeable plates to provide a voltage differential therebetween. This energy forms the plasma in the gas which is responsible for removing the material from the target.

For the present invention, the target is typically a cathode. A masking material is discontinuously deposited on the surface of the polymeric film as microislands. This masking material is selected as having a different rate of sputter etching than the polymeric film, usually a lower rate than the polymeric film, under a given set of sputter etch processing conditions. The masking material can be formed on the surface of the polymeric film by known sputter deposition or vacumm deposition techniques, such as described in U.S. Pat. No. 4,340,276 to Maffitt et al., incorporated herein by reference. Generally, metals and metal oxides are formed in this context, including those metal oxides formed in-situ during sputter etching, which have a lower sputter etch rate than the polymeric film.

In order to form the microislands of masking material on the polymeric film of the present invention, a polymeric film traverses through the plasma chamber at a specified rate, generally about 3.05 meters/minute. The target material is a metal or metallic oxide. The energy from the sputtering apparatus excites the gas and the metal or metallic oxide. This energy causes the metal or metallic oxide to be removed from the target and deposited upon the surface of the polymeric film. The sputter deposited material tends to coalesce into microislands on the surface of the polymeric film. Alternatively, the masking material can be deposited as microislands by known vacuum deposition techniques, such as by coating through a micropatterned and removable photoresist formed on the surface of the polymeric film. The thickness of the microislands of masking material on the polymeric surface is usually on the order of 0.1 to 10 nanometers, preferably 1.0 to 2.8 nanometers.

Then, differential sputter etching is performed to result in the formation of a discontinuous surface region in the polymeric surface. This discontinuous coating has a topography of micropedestals which vary in height within a range of approximately 0.01 to 1.0 micrometer, preferably between 0.05 to 0.2 micrometer and most preferably between 0.075 to 0.150 micrometer. These micropedestals are separated from adjacent micropedestals at a distance within a range of approximately 0.05 to 0.5 micrometers. Such a topography of micropedestals has been found to provide a surface exhibiting substantially increased surface area. The overall height of the micropedestals is controlled by combination of the sputter etching time and power and the difference in the sputtering etching time and power, and the difference in the sputter etch rates between the material and that of the polymeric film. The micropedestals surface properties are a function of the material being deposited, the composition and structure of the substrate, the substrate temperature, the deposition method and rate and vacuum conditions. Examples of sputter etching equipment is a Vecco model 776 radio frequency diode sputtering apparatus.

Maximization of differences in etch rate between bulk and mask is best achieved by reactively sputter etching in oxygen. The use of oxygen causes an oxide to form in the metal masking material, namely, chromium, which reduces its etch rate. For example, the etch rate of polyester film is two to four times higher in a reactive oxygen plasma than in argon, an inert gas associated with ionic or physical impact etching. On the other hand, the etch rate of the metal maskant, such as chromium, is reduced as it oxidizes in-situ to chromium oxide species in the presence of the oxygen ions in the plasma. The sputter etching is sufficiently anisotropic in nature in the exposed bulk of the polymeric film to leave pedestals of polymeric material directly beneath the masking material on the surface.

As understood by those of ordinary skill in the field, the control between isotropic ("nondirectional") and anisotropic ("directional") etching conditions in a reactive plasma environment generally can be managed by controlling any number of parameters such as the plasma feed volume, vacuum conditions (pressure) in the chamber, voltage differential, RF frequency or amplitude, and the respective materials selected for the bulk material and overlying masking material. Suitable sputter etching techniques and materials for forming the micropedestals of the present invention are described in U.S. Pat. No. 4,340,276, incorporated herein by reference. The masking material remaining on the surface of the polymeric film after etching is completed is usually left undisturbed on the surface as it does not impair the adherability of the surface. As an alternate treatment for the polymeric film, particularly if polyimide, the adhesion to fiber adhesive can be improved by corona discharge treatments generally known in the field.

Splice Adhesive

The splice adhesive is not particularly limited, and can be any resinous or glutinous material that has the desired strength, adhesion and heat resistance necessary for the end use of the abrasive belt. The resinous composition may be in liquid or plastic form, or in the form of a particulate solid capable of temporarily flowing upon heating, or as a resinous composition in a liquid comprising a heat curable resin component.

Examples of such splice adhesives include: urea formaldehyde resins, silicone resins, unsaturated polyesters, polyurethanes, bisamide polyesters, epoxy polyesters, epoxy polamides, bis-ketenes, epoxy resins, hyde glues, acrylate resins, styrene-polyesters, phenolic resins, polyamides and combinations thereof.

Method of Making the Endless Flexible Belt

In order to make a spliced endless belt configuration of the invention, the abrasive sheet material is first cut to the desired length. Typically, the length can be anywhere from 15 cm to 1000 cm, and especially practical lengths are between 30 cm and 500 cm. Preferably, each of the two free ends of the coated abrasive is cut through its width at an angle anywhere between 10 to 170 degrees, preferably 35 to 155 degrees relative to the central axis or machine direction of the belt. It is most preferable that one angle be 65 degrees and the other angle be 115 degrees. The two ends are cut such that the angles add up to 180 degrees so that there is minimal gap between the two abutting free ends and such that the two free ends do not overlap.

After the material is cut, it is preferable that the backside of the free ends are textured or roughened. Roughening is not a necessary process, although it is used frequently in the adhesive bonding arts. It involves light scuffing, sandblasting, abrading, grinding, and the like, of the surface of the backing treatment at the backside of the coated abrasive article. Roughening of the backside of the abrasive article on the surfaces of the article ends can be accomplished with a wire brush, sandblasting, sandpaper and the like. The roughening is basically employed to increase the surface area to be coated by the splice adhesive and the roughened topography enhances the anchoring of the splice adhesive to the backing surface, as opposed to a smooth surface.

Next, the splice adhesive is applied onto the backside of the two free ends of the abrasive article. The adhesive can be applied by such techniques as spraying, brushing, roll coating, knife coating or die coating over the roughened or scuffed area. Preferably the adhesive will be sprayed on in atomized form. The splice adhesive is applied along the entire width of each free end adjacent the site of the juncture line of the splice and in the machine direction of the abrasive article to a distance removed from the juncture line which at least will encompass the extent of the splice means when placed over the juncture line and free ends. The splice adhesive has a tendency to soak into the backing somewhat upon application. The application rate of the splice adhesive on the back surface of the abrasive article at the free ends generally is in the range of 0.35 to 17.5 mg/cm$^2$, preferably 1.75 to 15 mg/cm$^2$. If the splice adhesive coating rate is too low, there will be poor adhesion and the splice can fail, while if the rate is too high, excess adhesive undesirably exudes out of the splice site during press-bonding of the splice.

After the splice adhesive is coated, the two free ends are brought together juxtaposely at the faces of their ends to form a joint. Preferably, the free ends are brought together in a flush relationship with no gap or only a minimal gap therebetween for forming a butt splice. There should be no overlap between the two free ends to be spliced. As will be apparent, it is also within the scope of this invention to first bring the two free ends together and then apply the splice adhesive over the joint area as the sequentiality of these steps is not essential.

Next, the splice means of the invention is placed over the joint. Typically a roller is used to force the splice means into the splice adhesive to obtain and ensure intimate contact is established between the splice means and the splice adhesive.

Finally, the splice adhesive is cured or solidified. The curing process can be initiated by thermal or radiation energy by known means. This is typically accomplished by placing the joint in a heated press. The pressure applied is usually in the range of 24 kg/cm$^2$ to 184 kg/cm$^2$ along the splice. The temperature is selected to initiate the curing of the splice adhesive, but not too high to degrade the splice media or coated abrasive backing. The coated abrasive joint will stay in the press from about 5 to 50 seconds, preferably 5 to 20 seconds.

The butt splice will typically be made on a full width coated abrasive material and then, if desired, the full width material will be slit longitudinally in the machine direction of the belt, after the splicing procedure is completed, so as to be converted into any desired smaller width belts.

The following non-limiting examples will further illustrate the invention. All formulations are based upon weight unless otherwise noted.

EXAMPLES

Experimental Procedure
General Procedure For Splicing Coated Abrasive Belts

For the examples where a spliced belt was formed, a coated abrasive article was cut to a length of 335 cm and such that one end was cut at a 67 degree angle to the machine direction and the other end was cut at a 113 degree angle to the machine direction. The coated abrasive material used is described in the specific examples below. The coated abrasive belt had a width of 7.6 cm.

Approximately 1.5 cm of the backside surface area in the machine direction away from the terminus of each free end was roughened with an abrasive belt, under the trade designation BRUSHLON™; a bristle belt available from 3M, St. Paul, Minn. The two free ends were juxtaposely placed together to form a butt joint. Approximately 1.4 cm of the backside surface area in the machine direction away from the terminus of each free end was entirely coated with a splice adhesive containing solids obtained from Miles Inc. under the trade name DESMOCOLL 176, which is an adipic acid/ethylene glycol/polyester, diisocyanate reaction product having a hydroxyl functionality. 100 parts of DESMOCOLL 176 as a 19% solids solution in ethyl acetate, is reacted with 8 parts of triphenyl methane triisocyanate as a 27% solution in ethyl acetate, to form the splice adhesive.

A splice means having a type of construction described hereinbelow was positioned over the joint. Then the joint was placed in a heated press for approximately 10 seconds at a temperature of 93° C. and a pressure of approximately 142 kg/cm$^2$ along the splice. The resulting tube is then removed from the press in the form of an endless flexible abrasive belt having a butt joint and a splice formed integrally therein. The endless coated abrasive belt was ready for the testing procedures described below.

Test Procedure I

This test was designed to test the flex strength and durability of the spliced abrasive belt and the splice under a simulated use condition. The testing was done using a Model PFP 107 flex tester obtained from CO-AB-CO Abrasive Products, Inc., Abrasive Machines Div., Chicago, Ill., 60632.

The testing was done on 1.25 cm (width)×35 cm (length) samples cut from the particular spliced abrasive article being tested. Each test sample included the abrasive belt splice which included the abrasive splice means. The cut was made such that the splice (juncture line) was located at the mid-point of the sample. Samples were tested under ambient test conditions. The test involved gripping both ends of the sample and rapidly moving the spliced sample in a back-and-forth manner over a 0.64 cm diameter steel spindle such that the splice means was brought into contact with and run over the circumference of the spindle at a 90° angle. During the back-and-forth movement of the samples over the spindle, the test samples were put under a tension of 3.17 kg/cm$^2$ while conducting this test. A cycle was constituted by one complete back-and-forth-movement of the splice over the spindle at a 90° angle. The number of cycles until the splice means failed was counted. Failure of the splice means was determined as occuring when the splice separated at the splice joint due to either an adhesion failure or splice means breakage failure.

Test Procedure II

A tensile strength of the spliced belt was determined according to standard industry test method ASTM D638-86. The testing was done on 2.5 cm (width)×15.2 cm (length) samples cut from the particular spliced abrasive article being tested. Each test sample included the abrasive belt splice which included the abrasive splice means. The cut was made such that the splice (juncture line) was located at the mid-point of the sample. The test endpoint was determined as occuring when the splice separated at the splice joint due to either an adhesion failure or splice means breakage failure. The results were reported in N.

Test Procedure III

The adhesive strength (peel adhesion) of the adhesive (used as the fiber adhesive) to the polymeric support film was measured in the following manner. The industry standard procedure ASTM D413-82, entitled "Adhesion to Flexible Substrate" was employed. In this regard, the fiber adhesive was die coated onto one side of each of the various film substrates described in the examples herein. The adhesive-coated sides of the films were then pressed against the coated surface of another film piece of the same material utilizing a heat sealer at 5 kg/cm$^2$ downforce while heating to 65° C. to 80° C. This procedure was used to effect a bond between the two film surfaces with the adhesive to be tested.

2.5 cm×17.8 cm test samples were cut from the above-described bonded films. About 3.8 cm length along the surface of one end of each of the film pieces were left uncoated by the adhesive leaving these ends free for insertion into tensile test apparatus jaws. All samples were stored at 22° C., 50% relative humidity for 40 hours. Then, 1800° peel tests were run on these test samples according to ASTM D413-82 with a jaw speed of 5 cm/minute. The results were reported in kg/cm.

Sputter Etching Technique

As indicated in some of the examples hereinafter, the polymeric film of the splice means was subjected to a sputtering procedure before application of the fiber adhesive and filamentary reinforcements. In the sputtering procedure, where indicated in the examples, a polymeric film of the type described in the example was sputtered in a similar manner as disclosed in U.S. Pat. No. 4,340,276 to Maffitt et al. This was a two-step process. A 15 cm wide processor was employed for sputter coating and sputter etching. In general, in step one a discontinuous layer of chromium material was deposited onto the polymeric film surface followed by step 2 where oxygen sputter etching which removed controlled amounts of the polymeric film not covered by the chromium. In more detail, in step 1, the chromium was deposited onto the polymeric film by means of a planar dc magnetron sputtering source using pure argon as the sputtering gas. The flow of argon of about 30 to 50 cm$^3$/minute to maintain a pressure of 3 to 10 mTorr was applied. The polymeric film is moved continuously at 3.05 meters/minute over the sputtering source. Power was supplied to the sputter cathode in a controlled manner so as to deposit a layer of chromium whose average thickness is about 1.9 nm. After sputter coating the film was transported through a slit into a separate etching chamber.

In the second step the coated film was etched in an rf plasma while constrained against a water-cooled roll which was also the powered electrode for the rf plasma operated at 13.56 Mhz. The film speed and geometry of the roll were so selected to provide etching for 10 seconds; with a total power of 600 Watts applied and at a power density of 0.9 W/cm$^2$. These conditions provide a nominal etch depth of 115 nm. Etch depths exceeding about 80 were provided. The rf plasma was operated at pressures of 30 to 70 mTorr. Providing a pressure in this range was generated by combination of adding pure oxygen to the etching chamber and limiting the pumping speed. The etching step was a reactive process in which oxygen combined with the chemcial components (i.e., carbon, nitrogen, and hydrogen) of the polymer in the polymeric support film to form gaseous products, which are pumped away by the vacumm pumping system of the etch chamber. 300 cm$^3$/min of oxygen were added to the etch chamber and it was estimated that 40 cm$^3$/minute oxygen was converted to reaction products with the remainder being pumped away with out reaction. The resulting polymeric surface had protuberances that were about 100 nanometers deep.

Example 1 and Comparative Example A

The endless coated abrasive belts for these Examples were made according to the General Procedure For Making the Endless Abrasive Belt. Four different types of abrasive articles were spliced and tested for each of Example 1 and Comparative Example A. The abrasive article for Example 1A and Comparative Example A1 was a type P150 Y wt. cotton sateen Regal™ aluminum oxide Resin Bond Cloth obtained from 3M company, St. Paul, Minn. The abrasive article for Example 1B and Comparative Example A2 was a type 150×wt. cotton THREE-M-ITE™ Resin Bond Cloth obtained from 3M company, St. Paul, Minn. The abrasive article for Example 1C and Comparative Example A3 was a type 180×wt. polyester THREE-M-ITE™ Resin Bond Cloth obtained from 3M company, St. Paul, Minn. The abrasive article for Example 1D and Comparative Example A4 was a type 180×wt. rayon THREE-M-ITE™ Resin Bond Cloth obtained from 3M company, St. Paul, Minn.

The splice means used for splicing the abrasive articles of Examples 1A, 1B, 1C and 1D were constructed with a 14.2 μm thick polyester film obtained under the trade name Scotchpar™ from 3M Company, St. Paul, Minn.

The polyester film was not sputter etched. The fiber adhesive used for these splice means of the Example 1 series was a moisture-curable hot-melt urethane adhesive sold under the trade designation JET-WELD™ TS-230, commercially available from Minnesota, Mining and Manufacturing, St. Paul, Minn. The fiber adhesive was applied to one entire surface the polyester film at a coating rate of 4.2 mg/cm$^2$. While the fiber adhesive was still wet and uncured, reinforcing filaments were placed in the adhesive on the support film. The splice means was reinforced with filaments derived from 220 denier polyester yarns, which were loosened from their bundles into loose monofilaments arranged parallel to each other to provide a stacking at 2 layers of monofilaments in the fiber adhesive in a density of 787 filaments/cm. The filaments were continuous without disruptions in extent from one side of the polymeric film to the opposite edge. The filaments were oriented parallel to the central axis (machine diection) of the abrasive article when the splice means was bonded to over the juncture line of the abrasive article. The splice means was 1.9 cm wide and about 1×10$^2$cm thick.

On the other hand, a competitive splice means product was used for splicing the abrasive articles of Comparative Examples A1, A2, A3 and A4. The Comparative Example A was a splice media obtained from Sheldahl, Northfield Minn. comprising a 12.7 μm thick polyester film, which was not sputter etched, reinforced with polyester yarns and the fiber adhesive was derived from a solvent-based polyester resin adhesive thought to be prepared per U.S. Pat. No. 4,215,516 as a mixture of linear saturated esters of sebacic and terephthalic acids and ethylene glycol modified with a cross linking agent (e.g. polymethylene polyphenyl isocyanate) and an organic solvent component and system. This splice means was 1.9 cm wide and about 9×10$^3$ cm thick.

The splice means of Example 1 and coated abrasives were tested for flex property according to Test Procedure I and tensile strength according to Test procedure II, and the results are shown in Table 1. Eight samples of each example were tested for the tensile strength test of Test Procedure I and the average value thereof is reported in Table 1. Nine samples of each example were tested for the flex strength test of Test Procedure II and the average value thereof is reported in Table 1.

TABLE 1

| Example | Tensile Strength (N, Avg.) | Flex Cycles (Avg.) |
| --- | --- | --- |
| 1A | 716 | 15,461 |
| A1 | 778 | 1,891 |
| 1B | 756 | 36,875 |
| A2 | 836 | 14,896 |
| 1C | 765 | 37,421+[†] |
| A3 | 765 | 26,449+[††] |
| 1D | 747 | 7,167 |
| A4 | 792 | 4,245 |

[†]: For Example 1C, 6 of the 9 samples tested had not failed at 40,000 cycles where the test was terminated. All samples were included in the reported average value.
[††]: For Example A3, 4 of the 9 samples tested had not failed at 40,000 cycles where the test was terminated. All samples were included in the reported average values.

The results show that the abrasive articles spliced with the inventive splice means using the moisture cured hot melt adhesive as the fiber adhesive had siginficantly superior flex property and durability than the comparison product with comparable if not better, in several cases, tensile strength than the comparison product. Further, the prior art splice means emitted noxious solvent during formation of the splice means, whereas the splice means of the present invention avoids the use of noxious organic solvents.

Examples 2–24 and Comparative B–K

In Examples 2–24, a polymeric film as indicated below was die coated at an application rate of 4.2 mg/cm$^2$ with the same type of fiber adhesive as used in example 1, i.e., a moisture cured hot melt adhesive commercially available from the 3M Company, St. Paul, Minn. under the trade designation Jet Weld™ TS-230. For Comparison Examples B–K, the same solvent-based adhesive as described as the splice adhesive in the General Procedure for Splicing Coated Abrasive Belts, described supra, was used at an application rate of 7.2 mg/cm$^2$ dry wt. Then the resulting splice means component for each example was tested according to Test Procedure III and the results are shown in Table 3. Various different conditioning treatments were performed on some of the polymeric films prior to applying either of the above-mentioned adhesives thereto in order to investigate the possible effects thereof on the 1800° peel strength of the polymeric film, as indicated below.

For Examples 2, 4, 6, 7, and 8, the polymeric films were sputter etched according to the method described above. For Examples 9 through 14, the polymeric films were exposed to a flash lamp treatment. For examples 9, 11 and 13, the flash lamp energy was 3.3 Joules/cm; for examples 10, 12 and 14, the flash lamp energy was 2.8 Joules/cm.

For Examples 3, 5, 15, 16, 17 and 24, the polymeric film surfaces did not receive a treatment. For Examples 18 through 20, the polymeric films were sandblasted with grade 60 fused aluminum oxide. For Examples 21 and 22, the polymeric films were boiled with KOH (40% wt.) for about 20 seconds at 75°–80° C., while, in Example 23, the treatment lasted about 30 seconds. The polymeric film in Example 23, as observed, was unaffected by this treatment, while the films in Examples 21 and 22 were softened and became hazy due to this treatment, especially in Example 21.

The polymeric films of Comparative Examples B, C, D, E and F were sputter etched before application of the adhesive thereto, while the polymeric films in Comparative Examples G, H, I, J and K received no surface treatment.

TABLE 3

| Example | Polymeric Film | 180° Peel Adhesion (kg/cm) |
| --- | --- | --- |
| 2 | nylon[1] | 2.5 |
| 3 | nylon[1] | 1.1 |
| B | nylon[1] | 2.0 |
| G | nylon[1] | 0.7 |
| 4 | polyester[2] | 1.1 |
| 5 | polyester[2] | 1.0 |
| C | polyester[2] | 0.1 |
| H | polyester[2] | 0.2 |
| 6 | polyimide[3] | 2.9 |
| 7 | polyimide[4] | 3.0 |
| 8 | polyimide[5] | 3.5 |
| D | polyimide[3] | 1.2 |
| E | polyimide[4] | 1.2 |
| F | polyimide[5] | 1.8 |
| 9 | polyimide[3] | 1.6 |
| 10 | polyimide[3] | 1.7 |
| 11 | polyimide[4] | 2.3 |
| 12 | polyimide[4] | 2.7 |
| 13 | polyimide[5] | 1.0 |
| 14 | polyimide[5] | 1.1 |
| 15 | polyimide[3] | 1.0 |
| 16 | polyimide[4] | 2.5 |
| 17 | polyimide[5] | 0.4 |
| I | polyimide[3] | 0.3 |
| J | polyimide[4] | 1.1 |
| K | polyimide[5] | 0.9 |
| 18 | polyimide[3] | 0.9 |
| 19 | polyimide[4] | 0.7 |
| 20 | polyimide[5] | 0.8 |
| 21 | polyimide[3] | 0.3 |
| 22 | polyimide[4] | 0.6 |
| 23 | polyimide[5] | 0.4 |
| 24 | polyimide[6] | 2.1 |

[1]: A 76 μm thick nylon 66 film from DuPont Company obtained under the trade name "DARTEK".
[2]: A 127 μm thick polyester film from DuPont Company obtained under the trade name "MYLAR".
[3]: A 76 μm thick polyimide film commercially available from Allied Chemical Corp., Morristown, NJ. under the trade designation "APICAL 300 AV".
[4]: A 76 μm thick polyimide film commercially available from DuPont, Wilmington Delaware under the trade designation "KAPTON 300HN".
[5]: A 76 μm polyimide film commercially available from ICI Chemical under the trade designation "UPILEX 75R".
[6]: A 51 μm thick polyimide film commercially available from ICI Chemical, England under the trade designation "UPILEX SGA".

Is is preferred in this invention that the 180° bond peel strength be at least 1.1 kg/cm, more preferably at least 1.8 kg/cm, between the fiber adhesive and polymeric film backing bond to satisfactorily ensure that the splice means does not fail before other portions of the abrasive article construction during usage.

As shown by the above data, the sputter etched nylon and polyimide films showed high peel strength while the untreated nylon and polyimide films were borderline acceptable or inconsistently acceptable under this criteria. All of the the chemically etched or sandblasted polyimide films were relatively low and undesirable. The 180° peel values were generally not as high for the flash lamp treated sample as compared to the related sputter etched sample for the same type of material. The polyester samples were borderline irrespective of the type of treatment. There appeared to be a cohesive failure occurring as a separation of surface regions in the polyester layer before an adhesive failure occurred. Although limited improvement was achieved with sputter etching the polyester film, the sputter etching was not believed to be responsible for the ultimate failure.

The data also shows that the 180° peel adhesion strength of comparison Examples B–K using the solvent-based urethane adhesive were generally significantly lower than their counterparts using the nonsolvent based moisture curable urethane adhesive for the same type of polymeric material, whether sputter etched or not. Further, the solvent based adhesive used in Examples B–K did not appear to wet out very well on any of the various film surfaces creating numerous voids in the dried film layer.

Examples 25 and 26

The average flex property was analyzed for eight samples of abrasive articles of two kinds spliced with the same type of splice means used for Example 1, except that the polymeric film used in the splice means was instead a 20 μm thick polyimide film and, in Example 25, it was sputter etched according to the "Sputter Etching Technique" described hereinabove before being coated by the fiber adhesive, while the polymeric film in the splice means of Example 26 was not sputter etched. The two kinds of abrasive articles used were "Abrasive Article I": 150×wt. cotton THREE-M-ITE™ Resin Bond Cloth obtained from 3M company, St. Paul Minn., and "Abrasive Article II": 180×wt. polyester THREE-M-ITE™ Resin Bond Cloth obtained from 3M company, St. Paul, Minn. The results are summarized in Table 4.

TABLE 4

| Run | Flex Cycles | |
|---|---|---|
| | Abrasive Article I | Abrasive Article II |
| Example 25 | 2570 | 12540 |
| Example 26 | 2140 | 8220 |

In that the cycles endured before failure in Example 25 were significantly superior than Example 26 for the abrasive articles of each category, the results show the improved flex property where the polyimide support film in the splice means was sputter etched prior to coating with the fiber adhesive.

Examples 27 and 28

The average tensile strength property was analyzed for samples of abrasive articles of two kinds spliced with the same type of splice means used for Example 1, except that the polymeric film used in the splice means was instead a 20 μm thick polyimide film and, in Example 27, it was sputter etched according to the "Sputter Etching Technique" described hereinabove before being coated by the fiber adhesive, while the polymeric film in the splice means of Example 28 was not sputter etched. The two kinds of abrasive articles used were "Abrasive Article I": 150×wt. cotton THREE-M-ITE™ Resin Bond Cloth obtained from3M company, St. Paul, Minn., and "Abrasive Article II": 180×wt. polyester THREE-M-ITE™ Resin Bond Cloth obtained from 3M company, St. Paul, Minn. The average tensile strength value for eight spliced abrasive articles was determined for each category of abrasive article in Example 27 while the average tensile strength value for nine spliced abrasive articles was determined for each category of abrasive article in Example 28. The results are summarized in Table 5.

TABLE 5

| Run | Tensile Strength (N) | |
|---|---|---|
| | Abrasive Article I | Abrasive Article II |
| Example 27 | 859 | 845 |
| Example 28 | 840 | 805 |

The tensile strengths in Example 27 were superior than for Example 28 for the abrasive articles of each category. The results show the improved tensile strength property where the polyimide support film in the splice means was sputter etched prior to coating with the fiber adhesive.

While the invention has been described in detail and with reference to specific embodiments thereof, it will be apparent to one of skill in the art that various changes and modifications can be made thereto without departing from the spirit and scope of the invention.

What is claimed is:

1. A method for splicing a flexible abrasive belt comprising the steps of:

(a) positioning two free sheet ends of abrasive sheet material to be juxtaposely abutted together to form a juncture line, wherein said abrasive sheet material has opposed major surfaces with a coating of abrasive grains bonded to one of said major surfaces and a backing side constituting the other major surface; and wherein said two free ends on said backing side of said abrasive sheet material are roughened adjacent to said juncture line to form roughened areas having increased surface area;

(b) coating said roughened surfaces of said two free sheet ends with a splice adhesive;

(c) positioning a splice in contact with said splice adhesive to overlap said juncture line and contact the surfaces of each of said two free sheet ends wherein said splice comprises a polymeric film having a major surface and a plurality of monofilaments bonded to said major surface of said polymeric film by a hot melt fiber adhesive curable by exposure to water in the absence of nonaqueous liquid solvent, said plurality of monofilaments being arranged on said major surface of said polymeric film so as to span said juncture line, wherein said major surface of said polymeric film is sputter etched to provide a plurality of micropedestals therein of a height of from about 0.01 to 1.0 micrometer and of a spacing apart of from about 0.05 to 0.5 micrometer; and (d) curing said splice adhesive.

2. The method of claim 1, wherein a primer adhesive is applied to said splice means before contacting said two free ends sheets abutting said juncture line.

3. The product of the method of claim 1.

4. A method for splicing a flexible abrasive belt comprising the steps of:

(a) forming a composite surface by applying, onto at least one major face of a polymeric film, discontinuous microislands of a material selected from the group consisting of metal oxides, refractory metals, and noble metals having a lower rate of sputter etching than said polymeric film, wherein portions of said polymeric film are exposed between the discontinuities of said microislands;

(b) sputter etching said composite surface in a partial atmosphere of a reactive gas to promote formation of a top layer on said microislands having a lower sputtering rate than said polymeric film, whereby said exposed portions of said polymeric film are etched and removed at a faster rate than said top layer to form micropedestals structures in said composite surface;

(c) forming a splice means comprising (i) providing a support means composed of said sputter etched polymeric film formed by step (b), and (ii) coating said splice means with a fiber adhesive comprising a moisture-cured, non-solvent based hot melt urethane resin, then (iii) providing a fiber reinforcement on said fiber adhesive comprising a plurality of monofilaments arranged parallel and side-by-side on said sputter etched polymeric film, and curing said fiber adhesive to bond said monofilaments to said polymeric film;

(d) positioning two free sheet ends of an abrasive sheet material together into juxtaposed abutment to form a juncture line, wherein said abrasive sheet material has opposed major surfaces with a coating of abrasive grains bonded to one of said major surfaces and a backing side constituting the other major surface; and wherein material from said backing side of said two free sheet ends are roughened adjacent to said juncture line effective to form roughened areas having increased surface area;

(e) coating said roughened areas of said two free sheet ends with a splice adhesive comprising a solvent-based adhesive and optionally a polymerization reaction catalyst or accelerator;

(f) positioning said splice means in contact with said splice adhesive so as to overlap said juncture line and with an outer surface of said splice means, and wherein said monofilaments are oriented in a substantially parallel direction to said machine direction of said abrasive sheet material; and (g) curing said splice adhesive.

5. The method of claim 4, wherein said polymeric film comprises polyimide.

6. The product of the method of claim 4.

* * * * *